United States Patent
Pintsov et al.

(10) Patent No.: US 7,428,996 B2
(45) Date of Patent: Sep. 30, 2008

(54) METHOD AND SYSTEM FOR ENCODING INFORMATION INTO A BAR CODE WITH DIFFERENT MODULE SIZE

(75) Inventors: Leon A. Pintsov, West Hartford, CT (US); Robert A. Cordery, Danbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 392 days.

(21) Appl. No.: 11/281,672

(22) Filed: Nov. 17, 2005

(65) Prior Publication Data

US 2007/0108302 A1    May 17, 2007

(51) Int. Cl.
*G06K 7/10* (2006.01)
*G06K 9/18* (2006.01)

(52) U.S. Cl. .............. 235/462.09; 235/462.01; 235/462.1; 235/494

(58) Field of Classification Search ............ 235/462.09, 235/462.1, 462.11, 494, 462.02, 462.07
See application file for complete search history.

(56) References Cited

U.S. PATENT DOCUMENTS

| | | | |
|---|---|---|---|
| 4,725,718 A | 2/1988 | Sansone et al. | |
| 4,757,537 A | 7/1988 | Edelmann et al. | |
| 4,775,246 A | 10/1988 | Edelmann et al. | |
| 4,873,645 A | 10/1989 | Hunter et al. | |
| 5,513,563 A | 5/1996 | Berson | |
| 5,862,270 A * | 1/1999 | Lopresti et al. | 382/306 |
| 6,543,024 B2 * | 4/2003 | Gray | 714/769 |
| 2005/0199721 A1* | 9/2005 | Chang et al. | 235/462.1 |
| 2005/0269416 A1* | 12/2005 | Sussmeier et al. | 235/494 |

OTHER PUBLICATIONS

International Standard ISO/IEC 16022: 2000(E); Information Technology- International Symbology Specification- Data Matrix; First Edition, May 1, 2000.

* cited by examiner

*Primary Examiner*—Michael G. Lee
*Assistant Examiner*—Ali Sharifzada
(74) *Attorney, Agent, or Firm*—Brian A. Lemm; Angelo N. Chaclas

(57) ABSTRACT

Methods for generating and reading a two-dimensional barcode comprised of a number of data modules for storing a first encoded set of binary data and a second encoded set of binary data. The first set of binary data is encoded using a first data module size and the second set of binary data is encoded using a second data module size, wherein the first data module size is larger than the second data module size. Mail metering and verification systems for implementing the methods are also disclosed.

18 Claims, 5 Drawing Sheets

METHOD AND SYSTEM FOR ENCODING INFORMATION INTO A BAR CODE WITH DIFFERENT MODULE SIZE

FIELD OF THE INVENTION

The invention disclosed herein relates generally to barcodes and barcoding systems, and more particularly to a method and system for encoding information into a bar code with different data module sizes.

BACKGROUND

The United States Postal Service (hereafter referred to as the USPS) has implemented a program known as the Information Based Indicia Program (IBIP) which permits a user to generate a particular type of a postage indicium for sending a mail piece (e.g., letter, package, etc.). Typically, the user employs a postage meter certified by the USPS (or the government or private postal service for another country) to generate the indicium. The IBIP provides certain standards and regulations that the user must follow to purchase and print the indicium. For example, the IBIP specifies that the indicium must contain certain required information and may contain certain optional information such as, without limitation, the paid postage amount, the date and time the indicium was generated, the identification number of the postage meter used to generate the indicium, a postal service symbol, the class of service desired for the mail piece, the addressee ZIP code and/or address, and the sender's name and/or address.

The IBIP generally requires that the postage indicium be comprised of machine readable and human readable portions. The machine readable portion of the indicium may be in the form of a two dimensional barcode, such as, without limitation, a Data Matrix symbol. As is known, each Data Matrix symbol consists of a number of data regions having nominally square barcode modules arranged in an array. Each barcode module generally represents one bit of data. For a black on white Data Matrix symbol, for instance, a darkened (i.e., filled) barcode module represents a binary "one" and a light (e.g., empty or white) barcode module represents a binary "zero". The data regions are usually surrounded by a finder pattern which, in turn, is surrounded by a quiet zone border. Multiple data regions may be separated by an alignment pattern. A detailed description of the Data Matrix symbology can be found in ISO/IEC International Standard 16022:2000 (E) entitled "Information Technology—International Symbology Specification—Data Matrix".

The Data Matrix symbol in an IBIP indicium may carry encrypted information, such as the postage amount and other postal data that relate to the mail piece and to the postage meter that printed the indicium. The encrypted information which is in the symbol is usually referred to as a digital token or a digital signature, and it is used for authentication purposes. The encryption is also used to protect the integrity of information, including the postage amount, imprinted on the mail piece for later verification of postage payment. As a result, the altering of the printed information in an indicium, such as information relating to evidence of postage payment, is detectable by standard digital signature verification or Message Authentication Code (MAC) procedures. Examples of systems that are capable of generating and printing such indicia are described in U.S. Pat. Nos. 4,725,718, 4,757,537, 4,775,246 and 4,873,645, each assigned to the assignee of the present invention.

After indicium information and a barcode symbol representing the indicium information are generated, the indicium is either printed directly onto a mail piece or onto a meter tape or label that is attached to a mail piece. The mail piece is then deposited with the USPS where the indicium may later be verified. For example, the USPS may use an optical scanning device to create a digital image of the indicium. A barcode reading routine may then be employed to verify the authenticity and data integrity of the indicium (e.g., by decoding and interpreting the information contained within the indicium).

In order for the optical scanning device and barcode reading routine to function properly, it is critical that the print quality of postage indicia be at least at a certain acceptable level. This is especially true for Data Matrix symbols that employ barcode modules having a small size. For example, distortions (i.e., incorrect vertical or horizontal alignment of the modules within the symbol) and defects (e.g., streaks, lines, etc. running through the symbol) in the matrix grid may cause problems for the optical scanning device and/or the barcode reading routine. Defects and distortions may cause the reading system to fail to properly read the barcode, which can cause a verification failure of otherwise perfectly legitimate IBIP symbols. The mail piece may be incorrectly rejected as having inadequate postage and the requested level of service (e.g., first class) may not be provided as a result of a defect or distortion present in the matrix grid.

Thus, there exists a need for a system that generates barcodes in which information encoded within a two-dimensional barcode is easier to read.

SUMMARY

One aspect of the present invention relates to a method for generating a two-dimensional barcode comprised of a number of data modules. The method comprises preprocessing a first set of binary data, encoding the first set of binary data into the two-dimensional barcode using a first data module size, and encoding a second set of binary data into the two-dimensional barcode using a second data module size, wherein the first data module size is larger than the second data module size.

Another aspect of the present invention relates to a mail metering system comprising a processor and a printing device. The processor is structured to execute a routine for generating a two-dimensional barcode having a number of data modules structured to store binary data arranged in one or more data regions. The routine is adapted to preprocess a first set of binary data, encode the first set of binary data into the two-dimensional barcode using a first data module size, and encode a second set of binary data into the two-dimensional barcode using a second data module size, wherein the first data module size is larger than the second data module size. The printing device is in operable communication with the processor and is structured to print an indicium including the two-dimensional barcode.

Another aspect of the present invention relates to a method for reading a two-dimensional barcode comprised of a number of data modules for storing a first encoded set of binary data and a second encoded set of binary data, wherein the first encoded set of binary data has a first data module size and the second encoded set of binary data has a second data module size, the first data module size being larger than the second data module size. The method comprises extracting the first encoded set of the binary data and the second encoded set of binary data from the two-dimensional barcode, decoding the first encoded set of binary data to obtain a preprocessed data array, processing the preprocessed data array to generate a first set of binary data, and decoding the second encoded set of binary data to obtain a second set of binary data.

Therefore, it should now be apparent that the invention substantially achieves all the above mentioned aspects and advantages, substantially improving readability of the data encoded in the indicium. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

As employed herein, the term "number" shall mean one or more than one and the singular form of "a", "an", and "the" include plural referents unless the context clearly indicates otherwise.

Apparatus and methods for generating and verifying an indicium having information stored in a readable manner within a two-dimensional barcode such that the information can be retrieved even in the presence of print quality defects is discussed herein. More specifically, apparatus and methods for generating and authenticating an indicium having information stored in a more readable manner within a Data Matrix symbology while complying with existing Data Matrix binary encoding schemes is discussed herein.

Figure 1:
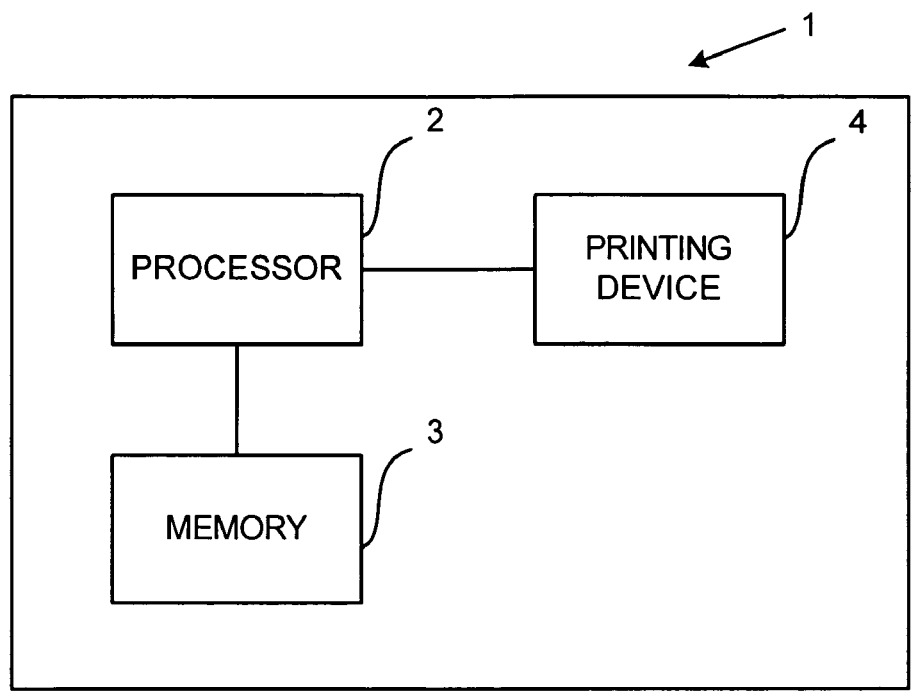
FIG. 1 is block diagram of a mail metering system according to the present invention.

FIG. 1 is a block diagram of a mail metering system 1 according to an exemplary embodiment of the present invention. Generally, mail metering system 1 is employed to print postage indicia for mail pieces. Mail metering system 1 comprises a processor, designated generally by the reference numeral 2, a memory, designated generally by the reference numeral 3, and a printing device, designated generally by the reference numeral 4.

Processor 2 is in operable communication with memory 3 and printing device 4 and is structured to execute any number of routines for, without limitation, generating and printing postage indicia. For example, processor 2 is structured to execute a routine that is adapted to generate an indicium that includes a two-dimensional barcode, such as a Data Matrix symbol, that includes a number of data modules and to cause the printing device 4 to print the indicium on a meter tape, a label, and/or directly on a mail piece. More specifically, the routine is adapted to preprocess a first set of binary data and encode the preprocessed first set of binary data into the two-dimensional barcode using a first effective module size, and encode a second set of binary data into the two-dimensional barcode using a second effective module size, wherein the first effective module size is larger than the second effective module size. It should be noted that processor 2 may execute other routines while remaining within the scope of the present invention. For example, processor 2 is structured to execute routines related to the encryption and decryption of the information contained within the indicium.

It should also be noted that the mail metering system 1 may include other components, the discussion of which have generally been omitted for clarity. For example, mail metering system 1 may include a number of input devices (not shown) which are in operable communication with processor 2 and which permit a user to interface with the mail metering system 1. The input devices may include, without limitation, a keyboard, a mouse, and/or a postage scale.

Memory 3 can be any of a variety of types of internal and/or external storage media such as, without limitation, RAM, ROM, EPROM(s), EEPROM(s), and the like that provide a storage register for data storage such as in the fashion of an internal storage area of a computer, and can be volatile memory or nonvolatile memory. The memory 3 provides storage for a number of routines for the processing of data. The routines can be in any of a variety of forms such as, without limitation, software, firmware, and the like which are executable by the processor 2. More specifically, the memory includes routines for generating an indicium according to the present invention that includes a Data Matrix symbol or other barcode in which information is stored in a more readable manner while still complying with the existing definition of Data Matrix binary encoding or other relevant encoding, as well as other routines.

Printing device 4 is in operable communication with the processor 2 and is structured to print the indicia generated by processor 2. In the exemplary embodiment, printing device 4 is structured to print an indicium on a meter tape, a label, and/or directly on a mail piece.

Figure 2:
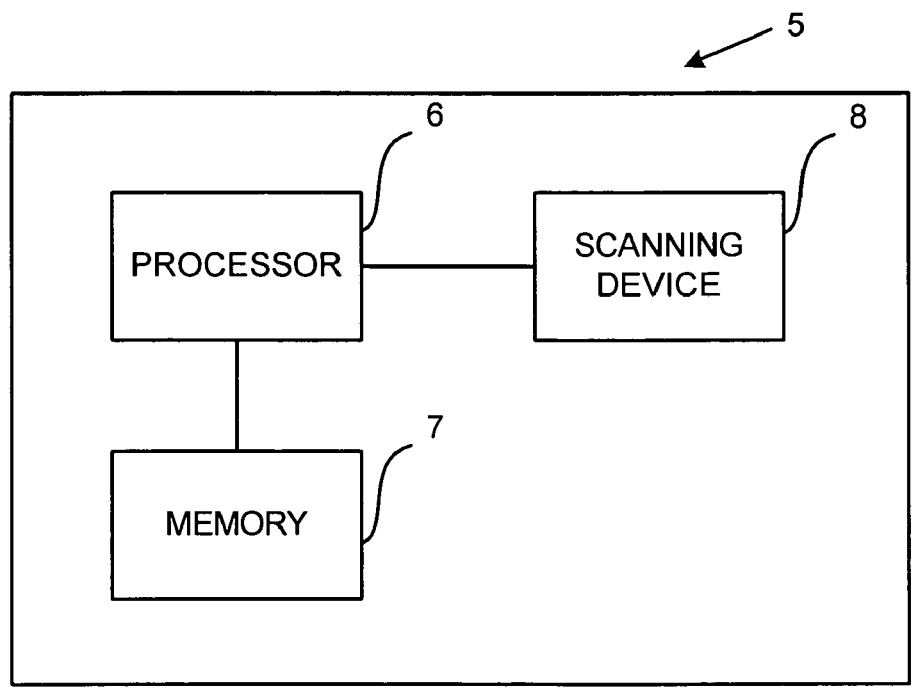
FIG. 2 is a block diagram of a mail verification system according to the present invention.

FIG. 2 is a block diagram of a mail verification system 5 according to an exemplary embodiment of the present invention. Generally, the mail verification system 5 is employed by a postal authority, for example the USPS, to verify that the postage printed by a mail metering system (e.g., mail metering system 1) is authentic and to protect the integrity of the data. Mail verification system 5 comprises a processor, designated generally by the reference numeral 6, a memory, designated generally by the reference numeral 7, and a scanning device, designated generally by the reference numeral 8.

Processor 6 is in operable communication with memory 7 and scanning device 8 and is structured to execute any number of routines for, without limitation, verifying postage indicia. For example, processor 6 is structured to cause the scanning device 8 to detect an indicium that includes a two-dimensional barcode, such as a Data Matrix symbol printed on a meter tape, a label, and/or directly on a mail piece and to execute a routine that is adapted to verify the two-dimensional barcode which is comprised of a number of data modules for storing a first encoded set of binary data and a second encoded set of binary data, wherein the first encoded set of binary data is encoded using a first effective module size and the second encoded set of binary data is encoded using a second effective module size and wherein the first effective module size is larger than the second effective module size. More specifically, the routine is adapted to extract the first encoded set of the binary data and the second encoded set of binary data from the two-dimensional barcode, decode the first encoded set of binary data to obtain a preprocessed data array, process the preprocessed data array to generate a first set of binary data, and decode the second encoded set of binary data to obtain a second set of binary data. It should be noted that processor 6 may execute other routines while remaining within the scope of the present invention. For example, processor 6 is structured to execute routines related to the encryption and decryption of the information contained within the indicium.

It should also be noted that the mail verification system 5 may include other components, the discussion of which have generally been omitted for clarity. For example, mail verification system 5 may include a number of input devices (not shown) which are in operable communication with processor 6 and which permit a user to interface with the mail verification system 5. The input devices may include, without limitation, a keyboard, a mouse, and/or a postage scale.

Like memory 3, memory 7 can be any of a variety of types of internal and/or external storage media such as, without limitation, RAM, ROM, EPROM(s), EEPROM(s), and the like that provide a storage register for data storage such as in the fashion of an internal storage area of a computer, and can be volatile memory or nonvolatile memory. The memory 7 provides storage for a number of routines for the processing of data. The routines can be in any of a variety of forms such as, without limitation, software, firmware, and the like are executable by the processor 6. More specifically, the memory 7 includes the routine for authenticating an indicium that includes a Data Matrix symbol or other barcode in which information is stored in a more readable manner according to the present invention while still complying with the existing definition of Data Matrix binary encoding or other relevant encoding, as well as other routines.

The scanning device 8 is in operable communication with the processor 6 and is structured to capture a digital image of the postage indicium on the meter tape, label, and/or mail piece. The digital images obtained from the scanning device 8 are communicated to processor 6 which employs a barcode reading routine which is used in verifying the authenticity and data integrity of the postage indicium.

Figure 3:
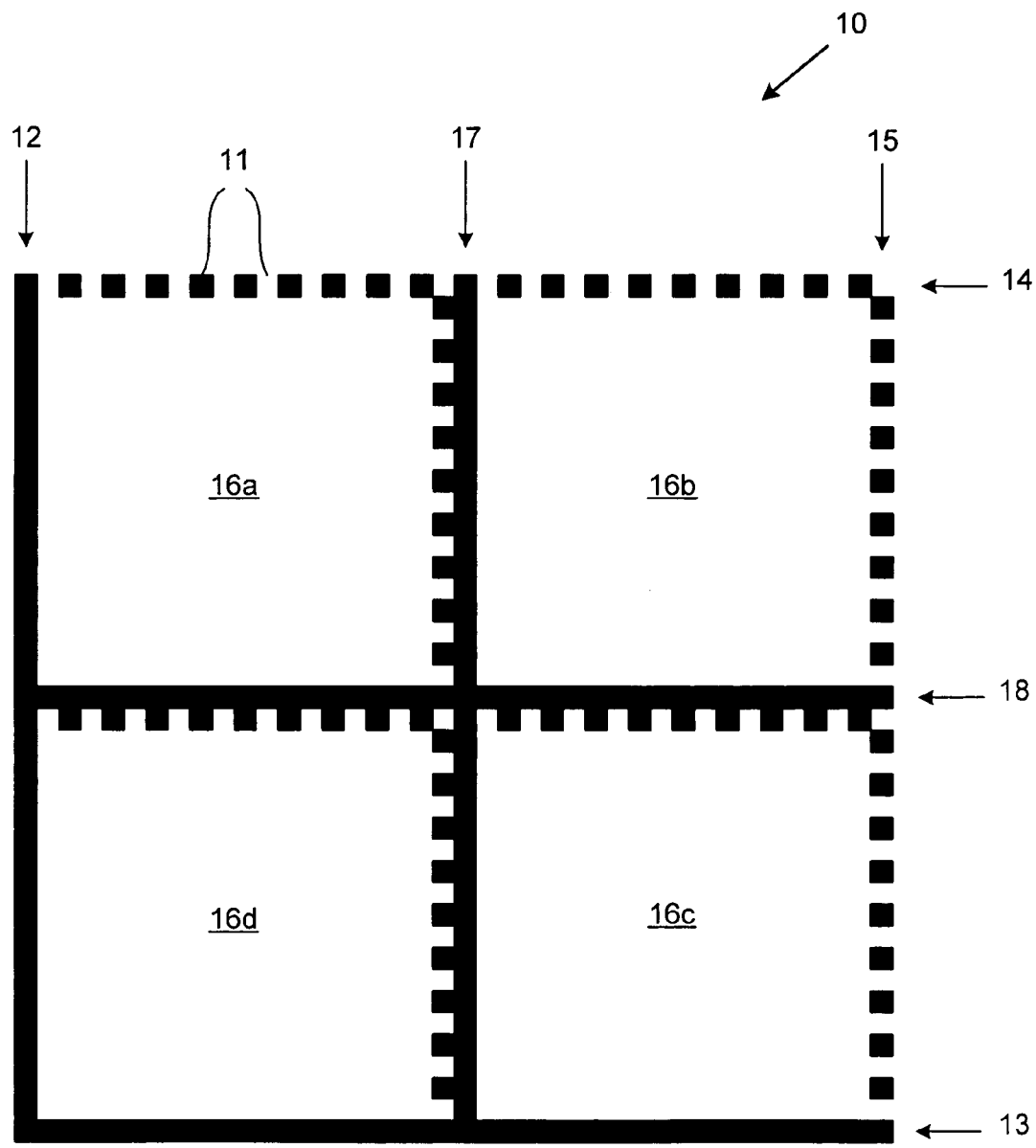
FIG. 3 illustrates the structure of an exemplary Data Matrix symbol without data stored therein.

FIG. 3 illustrates an exemplary 40×40 Data Matrix symbol 10. More specifically, the symbol 10 shown in FIG. 3 is comprised of 40 rows and 40 columns of barcode modules 11. The left-most column 12 and the bottom-most row 13 of the symbol 10 form an "L" boundary which is primarily employed to determine the physical size and orientation of the symbol 10 and to determine whether the symbol 10 was distorted, e.g., skewed, when printed. The top-most row 14 and right-most column 15 of the symbol 10 are comprised of alternating dark and light barcode modules 11 which are primarily employed to define the cell structure of the symbol 10 and to assist in determining the physical size and distortion of the symbol 10. As seen in FIG. 3, the symbol 10 is divided into four data regions 16a-16d by a vertical alignment bar 17 and a horizontal alignment bar 18. As shown in FIG. 3, each data region 16a-16d is comprised of 18 rows and 18 columns of barcode modules 11, and generally, has an "L" boundary on the left and bottom sides and alternating barcode modules on the top and right sides.

Figure 4:
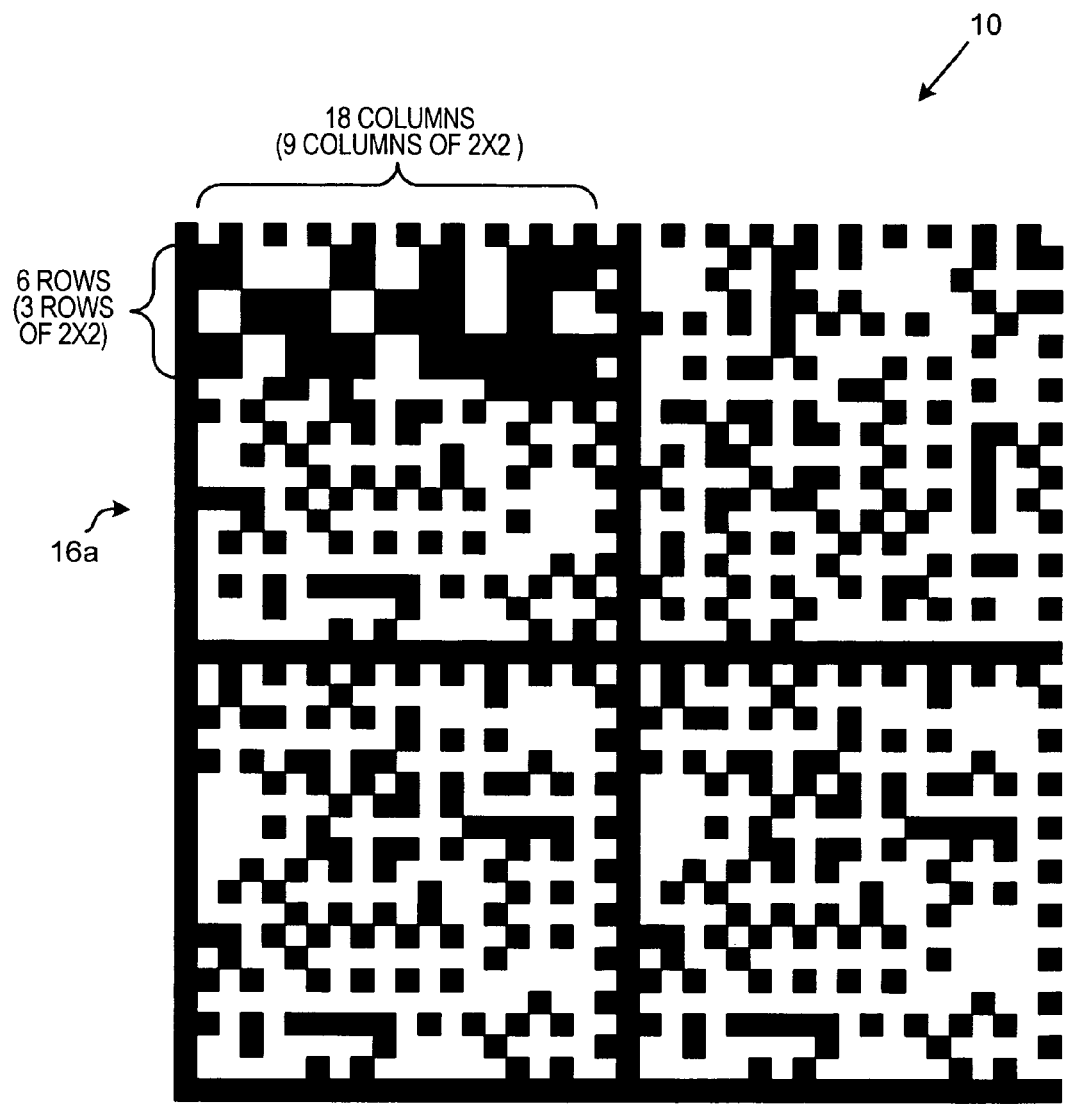
FIG. 4 is the exemplary Data Matrix symbol of FIG. 3 with data inserted into the data regions thereof.

FIG. 4 illustrates the Data Matrix symbol 10 of FIG. 3 with information encoded and stored within the four data regions 16a-16d according to one embodiment of the present invention. More specifically, some of the data is stored in larger data module size (e.g., two-by-two barcode modules). Referring to data region 16a in FIG. 4, for example, the first three rows (i.e., each of the three rows of data modules being two barcode modules high) and nine columns (i.e., each of the nine columns of the data modules being two barcode modules wide) are encoded using two-by-two data module blocks comprising two-by-two barcode moduels wherein each data module block represents a single bit of information. The remaining data within data region 16a and all of the data within the other data regions 16b-16d is encoded using the Data Matrix standard for encoding, i.e., each data module comprises a one-by-one barcode module, such that a single data module represents a single bit of information.

Twenty-seven (27) bits of information are encoded using the larger (i.e., two-by-two barcode module) data module size in the first three rows of data region 16a. Reading across the rows, the 9 bits of encoded data in the first row of the exemplary embodiment are 100101011; the 9 bits of encoded data in the second row are 011011010; and the 9 bits of encoded data in the third row are 101101111.

It should be noted that some of the twenty-seven bits of binary data D may include error correction and detection information. It should further be noted that the amount of data stored using a larger data module size and its location within the symbol 10 may be varied. For example, the larger data modules may be located somewhere within data region 16c (FIG. 3) instead of within data region 16a as is shown in FIG. 4. The location of the larger data modules can be application specific (e.g., always at the same location so that mail verification system 5 recognizes these larger data modules) or random (e.g., a "visual" recognition program can be employed to determine the location of these larger data modules).

By employing a larger data module size, critical information is more easily readable even in the presence of print quality problems. Critical information may include, for example and without limitation, mail piece identifiers needed for value added services and other intelligent mail applications, meter ID and postage needed for revenue protection, and addressee ZIP codes for open systems. Although discussed in conjunction with two-by-two blocks of data, it should be noted that other sized data blocks (e.g., one-by-two, three-by-three, four-by-four, etc.) may be employed for the larger data module size while remaining within the scope of the present invention.

To create the Data Matrix symbology 10 illustrated in FIG. 4, a user enters information associated with the indicium into the mail metering system 1 using, for example, a keyboard, a mouse, and/or a postal scale. This information is then converted into its binary equivalent. As discussed in ISO/IEC International Standard 16022:2000(E), the encoding scheme employed to convert the information into binary data may vary depending upon the different characters entered by the user (e.g., Base 11—numeric data; Base 27—upper-case alphabetic; Base 37—uppercase alphanumeric; Base 41—upper-case alphanumeric and punctuation; ASCII—Full 128 ASCII set; 8-bit Byte—user defined). This binary data may include both critical and non-critical data.

According to the present invention, the critical data is preprocessed and then the non-critical data and the preprocessed critical data are encoded into the two-dimensional barcode using the Data Matrix standard or other relevant standard. By preprocessing the critical data in the manner described herein prior to encoding, the critical data will appear in a first data module size when encoded into the barcode, whereas the non-critical data will appear in a second data module size. The first data module size consists or a greater number of adjacent barcode modules than the second data module size, and therefore is larger than the second data module size. As shown in FIG. 4, for example, the first data module size is two-by-two barcode modules, whereas the second data module size is one-by-one barcode modules (although other sizes may be used for both the critical and non-critical data). It should be noted, however, that the Data Matrix standard specified that the smaller data module size be one barcode module, i.e., one-by-one, for error correction purposes.

Figure 5:
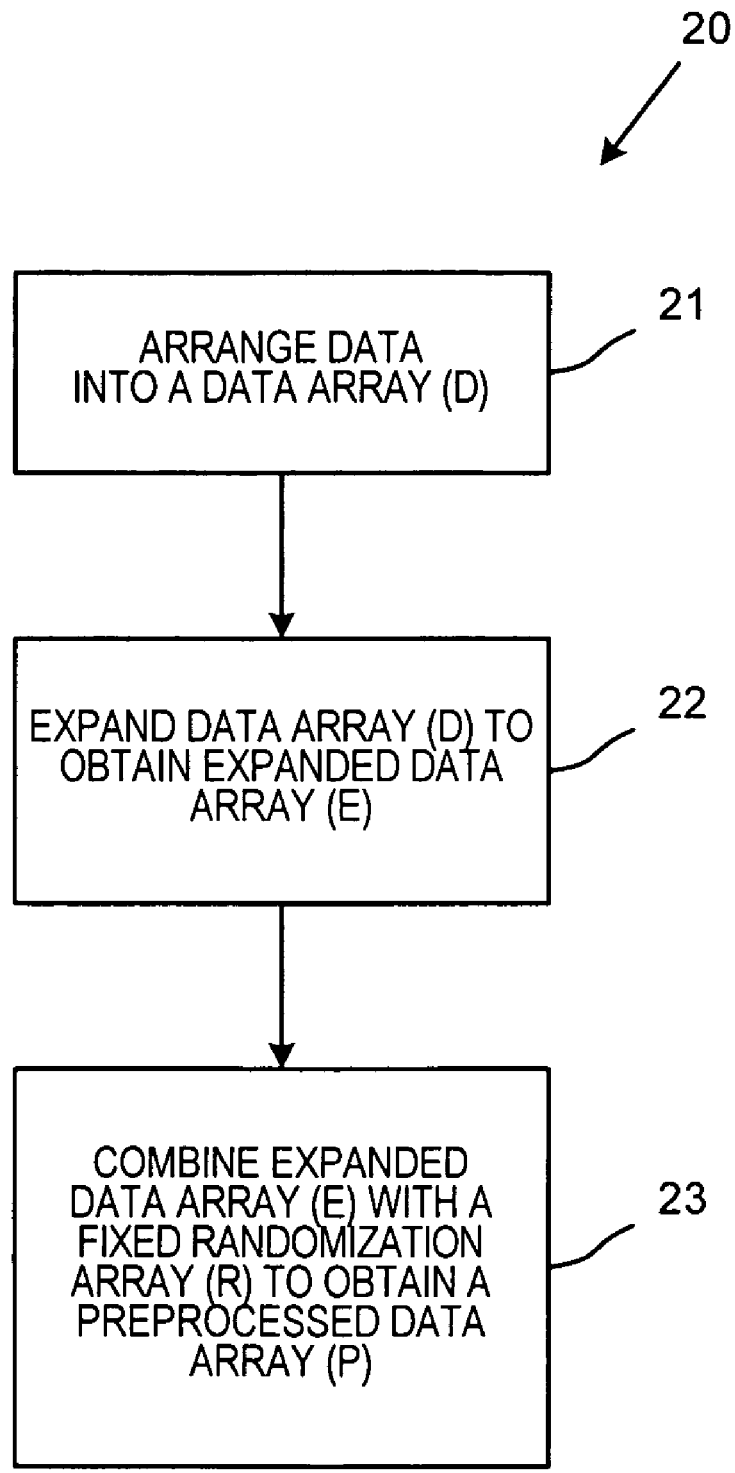
FIG. 5 is a flow chart illustrating an operational process for preprocessing data used in generating a Data Matrix symbol according to one embodiment.

FIG. 5 is a flow chart illustrating a routine 20 (or operational process 20) for preprocessing the critical data during creation of an indicium having a two-dimensional barcode, such as a Data Matrix symbol, according to one embodiment of the invention. Generally, operational process 20 is initiated after the information entered by the user is converted into its binary equivalent as discussed above. More specifically, in operation 21, at least a portion of this converted binary data (e.g., at least a portion of the critical data) is arranged in a data array (D). For example, when a user places a mail piece on a postage scale (not shown) and enters the mail piece address information, service level, etc. using a keyboard (not shown), this information is converted into binary data. In the current example, this binary data includes twenty seven bits of critical data. In operation 21, these twenty-seven bits of binary data are arranged in the following data array (D):

| Data Array (D) | | | | | | | | |
|---|---|---|---|---|---|---|---|---|
| 1 | 0 | 0 | 1 | 0 | 1 | 0 | 1 | 1 |
| 0 | 1 | 1 | 0 | 1 | 1 | 0 | 1 | 0 |
| 1 | 0 | 1 | 1 | 0 | 1 | 1 | 1 | 1 |

Operational control then passes to operation 22 where the data array (D) is expanded to obtain an expanded data array (E). For example, to create data modules that are formed by the two-by-two barcode modules illustrated in FIG. 4, the binary data within data array (D) is expanded by doubling each bit within each row and then repeating each row to obtain the following expanded data (E) array:

| Expanded Data Array (E) |
|---|
| 110000110011001111 |
| 110000110011001111 |
| 001111001111001100 |
| 001111001111001100 |
| 110011110011111111 |
| 110011110011111111 |

After the expanded data array (E) is constructed, operational control passes to operation 23 where the expanded data array (E) is operated upon by a randomization function that is identical to a randomization function that is used by the encoding scheme for the barcode being used in the indicium to encode all of the data forming a part of the barcode. More specifically, in the particular embodiment being described that employs an indicium having a Data Matrix symbol, expanded binary data array (E) is combined with a fixed randomization array (R) using an exclusive-or (XOR) operation. Again, the randomization array (R) is the same array used by the barcode encoding scheme. For example, expanded binary data array (E) may be combined, using an XOR operation, with the fixed randomization array (R) shown below:

| Randomization Array (R) |
|---|
| 101101100010110100 |
| 010110101101101110 |
| 011011011110111011 |
| 110101101110101011 |
| 101011101110111101 |
| 001100000111101011 |

Typically, the randomization function (e.g., randomization array (R)) is employed by the barcode encoding routine (as will be discussed below) to insure that sufficient module transistions (e.g., dark-to-light and/or light-to-dark) occur within the data regions 16a-16d so as to prevent a long string of dark modules and/or a long string of light modules. As will become apparent below, by using the same randomization array (R) during preprocessing of the critical data that will be used in encoding all of the data to form the two-dimensional barcode, the critical data in the two-dimensional barcode that is ultimatley produced will be made up of the desired larger data module size.

Continuing with the above example, combining each row of the expanded data array (E) with its associated row of the randomization array (R) using the XOR operation yields the following preprocessed results:

Row 1:

| | |
|---|---|
| 110000110011001111 | (E) |
| 101101100010110100 | (R) |
| 011101010001111011 | (P = E XOR R) |

Row 2:

| | |
|---|---|
| 110000110011001111 | (E) |
| 010110101101101110 | (R) |
| 100110011110100001 | (P = E XOR R) |

Row 3:

| | |
|---|---|
| 001111001111001100 | (E) |
| 011011011110111011 | (R) |
| 010100010001110111 | (P = E XOR R) |

Row 4:

| | |
|---|---|
| 001111001111001100 | (E) |
| 110101101110101011 | (R) |
| 111010100001100111 | (P = E XOR R) |

Row 5:

| | |
|---|---|
| 110011110011111111 | (E) |
| 101011101110111101 | (R) |
| 011000011101000010 | (P = E XOR R) |

Row 6:

| | |
|---|---|
| 110011110011111111 | (E) |
| 001100000111101011 | (R) |
| 111111110100010100 | (P = E XOR R) |

These results are combined in operation 23 to create a preprocessed data array (P) as shown below:

| Preprocessed Data Array (P) |
|---|
| 011101010001111011 |
| 100110011110100001 |
| 010100010001110111 |
| 111010100001100111 |
| 011000011101000010 |
| 111111110100010100 |

The data contained within the preprocessed data array (P) (i.e., the preprocessed critical data) and the non-critical data can then be encoded using, for example, the standard Data Matrix encoding routine or other encoding routine. In particular, during the Data Matrix encoding, all of the data being encoded into the barcode ((P) and the non-critical data) is operated upon by the randomization function, which in this case is XOR with the array R. As will be appreciated, this will result in the Data Matrix encoding routine calculating P XOR R (as well as the non-critical data NCD XOR R), thereby recovering the expanded data array (E) in the process. When the Data Matrix symbology is generated and printed using the normal Data Matrix routine, the expanded data array (E) will be printed in data region 16a such that it includes an expanded data module size (of two-by-two barcoe modules) for the twenty-seven critical data bits (embedded in the expanded data array (E)). In addition, the encoded non-critical data will be printed with a data module size of one-by-one barcode modules, as shown in FIG. 4.

Once the indicium having the Data Matrix symbology 10 is printed on (or attached to) a mail piece, the mail piece may be deposited with the USPS, which may later verify the indicium. In the current embodiment, the USPS employs a mail verification system 5 to verify the indicium. The indicuim with Data Matrix symbology 10 is scanned and the information stored therein is extracted. If the indicium is printed with sufficient print quality, a conventional scanning device should be able to read the complete two-dimensional barcode without any errors. If however, portions of the two-dimensional barcode cannot be read, conventional scanning devices will not read only those portions that it is able to read, but instead simply return an error message indicating the barcode could not be read. In such situations, therefore, it would be desirable to read at least the critical data to avoid the problem of incorrectly rejecting a mail piece due to a verification failure caused by the inability to read the two-dimensional barcode.

Figure 6:
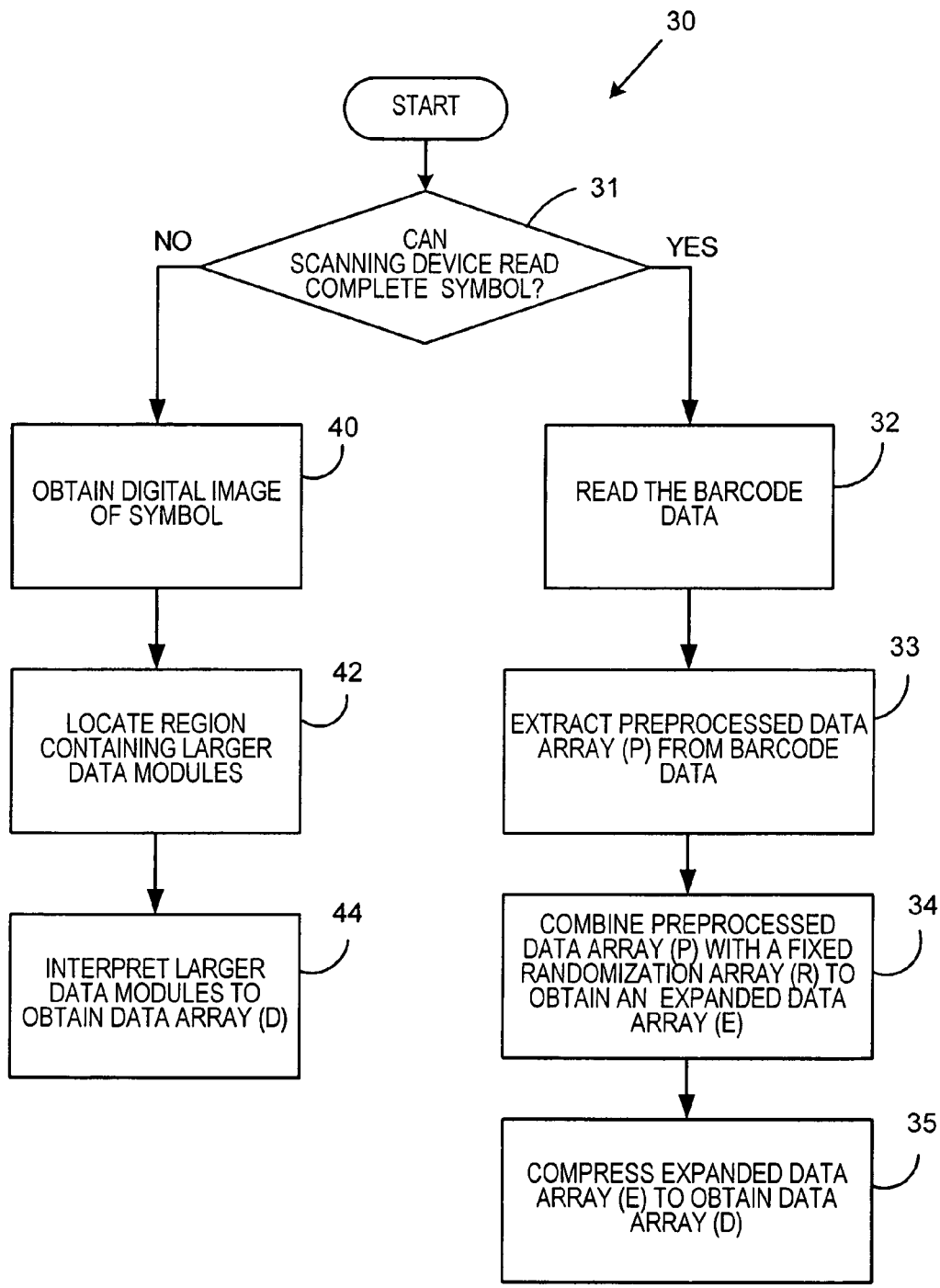
FIG. 6 is a flow chart illustrating an operational process for processing data during verification of information stored within a Data Matrix symbol according to one embodiment.

FIG. 6 is a flow chart illustrating a routine 30 (or operational process 30) that is executed by processor 6 for processing data during the verification of an indicium having a Data Matrix symbol according to an embodiment of the present invention. In operation 31, it is determined if the scanning device 8 can read the entire symbol 10. If yes, then in operation 32 the barcode is read. In operation 33, the preprocessed data array (P) is extracted from the read data using, for example, a decoding scheme as discussed in ISO/IEC International Standard 16022:2000(E). More specifically, the decoding scheme XOR's the stream of binary data from the read Data Matrix symbol with the randomization array (R). As will be appreciated, the decoding will produce the preprocessed data array (P), as shown below, and the non-critical data in binary form.

| Preprocessed Data Array (P) |
|---|
| 011101010001111011 |
| 100110011110100001 |
| 010100010001110111 |
| 111010100001100111 |
| 011000011101000010 |
| 111111110100010100 |

The preprocessed data array (P) may then be processed to obtain the critical binary data set. In operation 34, the preprocessed data array (P) is combined with the randomization array (R). More specifically, in the current embodiment, preprocessed data array (P) is combined with a fixed randomization array (R) using an exclusive-or (XOR) operation. For example, preprocessed data array (P) is combined, using an XOR operation, with the fixed randomization array (R) shown below:

| Randomization Array (R) |
|---|
| 101101100010110100 |
| 010110101101101110 |
| 011011011110111011 |
| 110101101110101011 |
| 101011101110111101 |
| 001100000111101011 |

Combining each row of the preprocessed data array (P) with its associated row of the randomization array (R) using the XOR operation yields the following preprocessed results E:

Row 1:

| | |
|---|---|
| 011101010001111011 | (P) |
| 101101100010110100 | (R) |
| 110000110011001111 | (E = P XOR R) |

Row 2:

| | |
|---|---|
| 100110011110100001 | (P) |
| 010110101101101110 | (R) |
| 110000110011001111 | (E = P XOR R) |

Row 3:

| | |
|---|---|
| 010100010001110111 | (P) |
| 011011011110111011 | (R) |
| 001111001111001100 | (E = P XOR R) |

Row 4:

|  |  |
|---|---|
| 1110101000011100111 | (P) |
| 110101101110101011 | (R) |
| 001111001111001100 | (E = P XOR R) |

Row 5:

|  |  |
|---|---|
| 011000011101000010 | (P) |
| 101011101110111101 | (R) |
| 110011110011111111 | (E = P XOR R) |

Row 6:

|  |  |
|---|---|
| 111111110100010100 | (P) |
| 001100000111101011 | (R) |
| 110011110011111111 | (E = P XOR R) |

These results are combined in operation 34 to create an expanded data array (E) as shown below:

| Expanded Data Array (E) |
|---|
| 110000110011001111 |
| 110000110011001111 |
| 001111001111001100 |
| 001111001111001100 |
| 110011110011111111 |
| 110011110011111111 |

After the expanded data array (E) is constructed, operational control passes to operation 35 where the expanded data array (E) is compressed to obtain data array D. In the current embodiment, for example, each alternate, duplicate row is eliminated and each double bit is reduced to a single bit. Eliminating each alternate, duplicate row and reducing each doubled bit in the current example yields the following data array D:

| Data Array (D) | | | | | | | | |
|---|---|---|---|---|---|---|---|---|
| 1 | 0 | 0 | 1 | 0 | 1 | 0 | 1 | 1 |
| 0 | 1 | 1 | 0 | 1 | 1 | 0 | 1 | 0 |
| 1 | 0 | 1 | 1 | 0 | 1 | 1 | 1 | 1 |

The critical binary data within data array (D) and the non-critical binary data from the barcode reading routine can then be converted back into a character set which may then in turn, for example, be displayed on an output device for use by the USPS or any verifier in general.

If in operation 31 it is determined that the scanning device 8 cannot read the entire symbol, then in operation 40 a digital image of the Data Matrix symbol 10 is captured using scanning device 8 and the digital image is communicated to processor 6. The processor 6 then executes a barcode reading routine to extract the data from the Data Matrix symbol. Specifically, in operation 42, the image is processed to locate the region containing the larger data modules, e.g., the first six rows of region 16a. In operation 44, the larger data modules are intrpreted to obtain the binary data, using for example, threshold analysis to determine black or white data modules. The extracted binary data forms the Data Array (D) for the information included in the larger data modules as follows:

| Data Array (D) | | | | | | | | |
|---|---|---|---|---|---|---|---|---|
| 1 | 0 | 0 | 1 | 0 | 1 | 0 | 1 | 1 |
| 0 | 1 | 1 | 0 | 1 | 1 | 0 | 1 | 0 |
| 1 | 0 | 1 | 1 | 0 | 1 | 1 | 1 | 1 |

The binary data within data array (D) extracted by the barcode reading routine can then be converted back into a character set which may then in turn, for example, be displayed on an output device for use by the USPS or any verifier in general While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method for generating a two-dimensional barcode having a number of data modules, each of said data modules comprising at least one barcode module, said two-dimensional barcode based being based on an encoding scheme, the method comprising:

preprocessing a first set of binary data using a randomization function to generate preprocessed data;

encoding said preprocessed data into said two-dimensional barcode in the form of a first plurality of said data modules, said first plurality of said data modules having a first data module size; and encoding a second set of binary data using said encoding scheme into said two-dimensional barcode in the form of a second plurality of said data modules, said second plurality of said data modules having a second data module size, wherein said first data module size is larger than said second data module size.

2. The method of claim 1 wherein said two-dimensional barcode is a Data Matrix symbol and wherein said encoding scheme is a Data Matrix encoding routine.

3. The method of claim 1, wherein preprocessing said first set of binary data further comprises:

arranging said first set of binary data into a data array and expanding said data array into an expanded data array; and combining said expanded data array with a randomization array to generate said preprocessed data.

4. The method of claim 3 wherein said data array comprises a plurality of bits arranged in a plurality of rows and wherein expanding said data array into an expanded data array comprises doubling each of said bits within each of said rows and thereafter repeating each of said rows within said data array.

5. The method of claim 3 wherein combining said expanded data array with a randomization array to obtain said preprocessed data comprises combining said expanded data array and said randomization array using an exclusive-OR function.

6. The method of claim 1 further comprising:
detecting information input by a user; and
converting said information into at least one of said first set of binary data and said second set of binary data.

7. A mail metering system comprising:
a processor;
a memory storing a routine executable by said processor, said routine being for generating a two-dimensional barcode having a number of data modules, said two-dimensional barcode being based on an encoding scheme, the routine being adapted to:
preprocess a first set of binary data using a randomization function to generate preprocessed data;
encode said preprocessed data into said two-dimensional barcode in the form of a first plurality of said data modules, said first plurality of said data modules having a first data module size; and
encode a second set of binary data using said encoding scheme into said two-dimensional barcode in the form of a second plurality of said data modules, said second plurality of said data modules having a second data module size, said first data module size being larger than said second data module size; and
a printing device in operable communication with said processor, said printing device structured to print an indicium including said two-dimensional barcode 8. The mail metering system of claim 7, wherein said routine is further adapted to detect information input by a user and convert said information into at least one of said first set of binary data and said second set of binary data.

9. The mail metering system of claim 8, wherein said two-dimensional barcode is a Data Matrix symbol and whereas said encoding scheme is a Data Matrix encoding routine.

10. The mail metering system of claim 8 wherein preprocessing said first set of binary data comprises arranging said first set of binary data into a data array, expanding said data array into an expanded data array and combining said expanded data array with a randomization array to generate said preprocessed data.

11. The mail metering system of claim 10 wherein said data array comprises a plurality of bits arranged in a plurality of rows and wherein said expanding said data array into an expanded data array comprises doubling each of said bits within each of said rows and thereafter repeating each of said rows within said data array.

12. The mail metering system of claim 10 wherein combining said expanded data array with a randomization array to generate said preprocessed data includes combining said expanded data array and said randomization array using an exclusive-OR function.

13. A method for reading a two-dimensional barcode having a number of data modules for storing a first encoded set of binary data and a second encoded set of binary data, wherein said first encoded set of binary data is in the form of a first plurality of said data modules, said first plurality of said data modules having a first data module size, and said second encoded set of binary data is in the form of a second plurality of said data modules, said second plurality of said data modules having a second data module size, said first data module size being larger than said second data module size, wherein said two-dimensional barcode is based on an encoding scheme that utilizes a randomization function, wherein said second encoded set of binary data is generated using said encoding scheme, and wherein said first encoded set of binary data is generated by preprocessing a first set of binary data using at least said randomization function to generate preprocessed data and encoding said preprocessed data using said encoding scheme, the method comprising:
extracting said first encoded set of said binary data and said second encoded set of binary data from said two-dimensional barcode;
decoding said first encoded set of binary data to obtain said preprocessed data;
processing said preprocessed data using at least said randomization function to obtain said first set of binary data; and
decoding said second encoded set of binary data to obtain a second set of binary data.

14. The method of claim 13 further comprising converting said first set of binary data and said second set of binary data into an output.

15. The method of claim 13 wherein said preprocessing said first set of binary data includes expanding said first set of binary data to create expanded data and applying said randomization function to said expanded data to generate said preprocessed data, wherein said processing said preprocessed data comprises:
applying said randomization function to said preprocessed data to obtain said expanded data; and
compressing said expanded data into said first set of binary data.

16. The method of claim 13 wherein said two-dimensional barcode is a Data Matrix symbol and wherein said encoding scheme is a Data Matrix encoding routine.

17. The method of claim 13, wherein if said first encoded set of said binary data and said second encoded set of binary data cannot be extracted from said two-dimensional barcode, said method further comprises:
obtaining an image of the two-dimensional barcode;
locating a region containing said plurality of first data modules; and
interpreting said region containing said plurality of first data modules to obtain said encoded first set of binary data.

18. The method of claim 17, wherein interpreting said region containing said plurality of first data modules further comprises:
using a threshold analysis to obtain said encoded first set of binary data.

* * * * *